(12) United States Patent
Harding

(10) Patent No.: US 9,615,568 B2
(45) Date of Patent: Apr. 11, 2017

(54) WATERFOWL DECOY CARRYING AND STORAGE DEVICE

(71) Applicant: Sean Harding, Huntsville, TX (US)

(72) Inventor: Sean Harding, Huntsville, TX (US)

( * ) Notice: Subject to any disclaimer, the term of this patent is extended or adjusted under 35 U.S.C. 154(b) by 251 days.

(21) Appl. No.: 14/640,639

(22) Filed: Mar. 6, 2015

(65) Prior Publication Data

US 2016/0255945 A1 Sep. 8, 2016

(51) Int. Cl.
*A01M 31/06* (2006.01)

(52) U.S. Cl.
CPC .................................. *A01M 31/06* (2013.01)

(58) Field of Classification Search
USPC .................. 43/3, 2, 54.1; 224/255, 209, 600
See application file for complete search history.

(56) References Cited

U.S. PATENT DOCUMENTS

| | | | |
|---|---|---|---|
| 2,820,547 A | 1/1958 | Nelson | |
| 2,899,997 A | 8/1959 | Rauen | |
| 4,599,819 A * | 7/1986 | Voges, Jr. | A01M 31/06 43/2 |
| 4,826,099 A | 5/1989 | Johnson | |
| 5,074,071 A | 12/1991 | Dunne | |
| 5,816,458 A * | 10/1998 | Yonenoi | A45F 5/02 224/182 |
| 6,155,001 A * | 12/2000 | Marin | A01K 97/01 43/26 |
| 6,408,558 B1 * | 6/2002 | Cornell, Jr. | A01M 31/06 43/2 |
| 7,347,024 B1 | 3/2008 | Vest | |
| 7,475,509 B2 | 1/2009 | Cagle | |
| 7,788,839 B2 | 9/2010 | McPherson | |
| 8,006,465 B1 * | 8/2011 | Albert, III | A01M 31/06 53/413 |
| 9,314,012 B1 * | 4/2016 | Galloway | A01M 31/06 |
| 2004/0237373 A1 * | 12/2004 | Coleman | A01M 31/06 43/3 |
| 2005/0067449 A1 * | 3/2005 | Jauvin | A41F 9/002 224/254 |
| 2008/0184610 A1 * | 8/2008 | Pfeifle | A01M 31/06 43/3 |
| 2009/0114687 A1 * | 5/2009 | Wu | A45F 5/00 224/242 |
| 2011/0023349 A1 * | 2/2011 | Hughes | A01M 31/06 43/3 |
| 2013/0174466 A1 * | 7/2013 | Saringer | A01M 31/06 43/2 |

(Continued)

*Primary Examiner* — Christopher P Ellis
(74) *Attorney, Agent, or Firm* — Egbert Law Offices, PLLC

(57) ABSTRACT

An apparatus for carrying waterfowl decoys is provided having a hollow tubular member with an inner diameter. A line extends through the interior of the hollow tubular member. A first, smaller clip is affixed to one end of the line and a second, larger clip is affixed to the other end of the line. The first clip is sized so as to be able to be passed through the interior of the hollow tubular member, while the second clip is sized such that cannot be passed through the interior of the hollow tubular member. The hollow tubular is preferably flexible. The cables of the waterfowl decoys are drawn by the smaller clip into the interior of the hollow tubular member so as to allow for carrying of the waterfowl decoys.

20 Claims, 6 Drawing Sheets

(56) References Cited

U.S. PATENT DOCUMENTS

| | | | |
|---|---|---|---|
| 2013/0212924 A1* | 8/2013 | Shisko | A01M 31/06 43/2 |
| 2014/0331542 A1* | 11/2014 | Andrews | A01M 31/06 43/3 |
| 2014/0338250 A1* | 11/2014 | Leventini | A01M 31/06 43/3 |

* cited by examiner

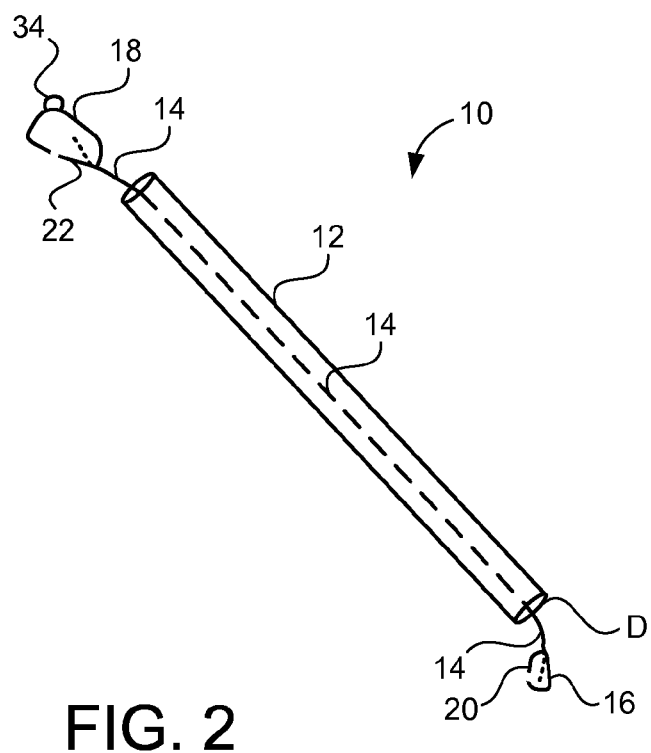
FIG. 2
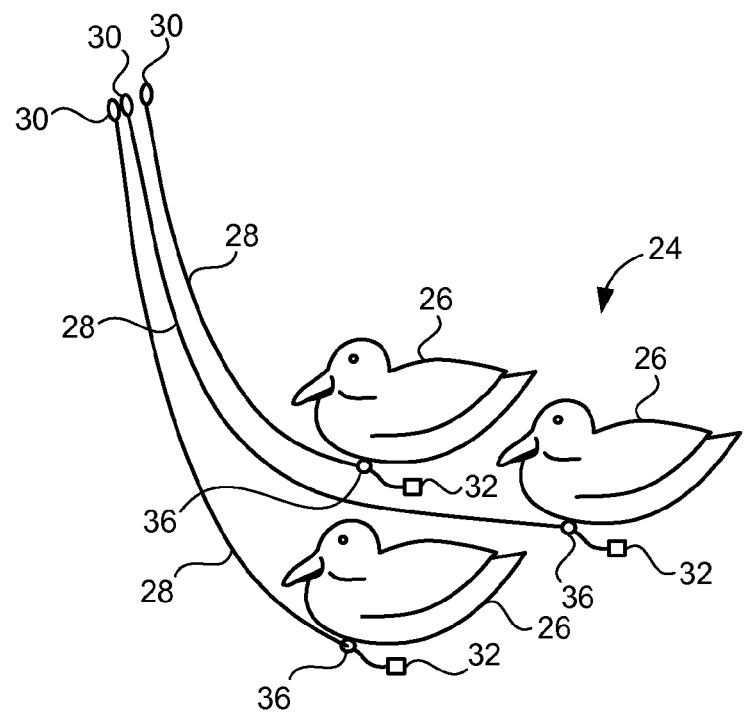

WATERFOWL DECOY CARRYING AND STORAGE DEVICE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of hunting. More particularly, the present invention relates to the field of duck hunting. Even more particularly, the present invention relates to a device for carrying and storage of decoys used during duck or other waterfowl hunting.

2. Description of Related Art Including Information Disclosed Under 37 CFR 1.97 and 37 CFR 1.98.

In the art and sport of duck hunting, the use of decoys is quite common, often in sizable numbers. Because in most circumstances hunters must set out and retrieve their decoys each day they hunt, besides possibly requiring repeated settings, for example due to a change in wind or relocating to a spot with more duck activity. Normally a cable of varied lengths is attached to the decoy on one end and to an anchor on the other, to keep the decoys in place. With the use of dozens of decoys, it becomes a tedious and time-consuming task to wrap the cable, with weights, in some fashion around the decoys so that they don't become entangled with one another when placed in a decoy bag or boat as such.

Referring to FIG. 1, there is shown a duck decoy as commonly used in the prior art. The duck decoy 24 includes a duck-shaped float 26. The float 26 is typically hollow or wooden and will flow to top surface of the water. A keel 27 is typically provided at the bottom of the float 26 so as to orient the flow 26 in an upright manner. The keel 27 is often weighted so as to accomplish this task.

FIG. 1, it can be seen how there is a cable 28 attached to the decoy 24. A hoop or other connection 36 is provided on the keel 27 through which the cable 28 extends. On one end of the cable 28, there is a loop 30, while on the other end there is a weight 32. When deployed, the weight 32 sinks towards the bottom of the water, pulling the cable 28 through the hoop 36. The loop 30 is of a sufficient size so as to prevent the loop 30 from being pulled through the connection 36. As will become clear from a reading of the specification below, the loop 30 is used for the deployment, retrieval and storage of the decoy 24.

Various patents have issued in the past relating to decoys used in waterfowl hunting, and in particular duck hunting. For example, U.S. Pat. No. 2,820,547 (the '547 patent), issued on Jan. 21, 1958 to Nelson, describes a decoy carrying case. The carrying case of the '547 patent generally resembles a trunk, and has spots allocated for positioning of decoys therein. The spots are positioned such that the decoys are securely and segregatedly position within the case.

U.S. Pat. No. 2,899,997 (the '997 patent), issued on Aug. 18, 1959 to Rauen, describes another duck decoy carrier. In the '997 patent, the decoy carrier is a fabric bag having a plurality of slots on opposing sides of the bag. The plurality of slots or bags are suitable for receipt of duck decoys therein.

U.S. Pat. No. 4,826,099 (the '099 patent), issued on May 2, 1989 to Johnson, describes a cord reel device for automatically winding a decoy cord. In the '099 patent, a reel having a hollow center and a bore extending from the surface of the reel to the hollow center thereof is located within a housing which is attachable to a decoy. A rubber band extends through the reel's hollow center and is attached at either end to the housing. The decoy cord passes through the bore and is tied around the rubber band and a tab inserted into the midportion of the rubber band. When the cord is pulled, the reel unwinds to release the cord, thereby twisting the rubber band. The twisted rubber band exerts a torsional force on the reel which automatically rewinds the cord when the pulling force on the cord is sufficiently diminished.

U.S. Pat. No. 5,074,071 (the '071 patent), issued on Dec. 24, 1991 to Dunne, describes a decoy holder assembly. In particular, the '071 patent describes a decoy holder assembly having a plurality of decoys, a center block, and a plurality of connecting rods pivotally joined to the center block for holding the decoys. A locking element is rotatably mounted onto the center block and includes a plurality of spaced apart outwardly extending arm members. The arm members are placed in overlying relationship with respect to the connecting rods to restrict their movement from a position extending outwardly from the center block to a position directly below the block when the locking element is rotated to a first or locked position. Conversely, when rotated to a second or unlocked position, the locking element removes the arm members from overlying relationship with the connecting rods, releasing them so that they can pivot freely about the center block.

U.S. Pat. No. 7,347,024 (the '024 patent), issued on Mar. 25, 2008 to Vest, describes another decoy system. In particular, the '024 patent describes a decoy system wherein decoys are placed, retrieved, and stored in a system that contains a line assembly and a holder. The line assembly contains a main line having an anchor at each end and a stop member attached to the line a spaced distance from the anchor, and a plurality of decoy lines connected at their proximate ends to the main line at spaced intervals. Each decoy line is adapted for connection to a decoy at its distal end and has a stop member attached to the line a spaced distance from the distal end. The holder is a tube having a longitudinal slot extending from the inlet end substantially the entire length of the tube. The slot has a width about equal to or greater than the main line and less than the stop members. The tube has a diameter and a length sufficient to accommodate the main line, the decoy lines, and the stop members within its interior.

U.S. Pat. No. 7,475,509 (the '509 patent), issued on Jan. 13, 2009, to Cagle. The '509 patent describes a decoy anchor including a tether attached to a floating decoy at a first end and a weight mounted on the tether and freely slidable to a position substantially adjacent to the floating decoy.

U.S. Pat. No. 7,788,839 (the '839 patent), issued on Sep. 7, 2010 to McPherson. The '839 patent describes a compressible decoy. The decoy '039 patent expands into a fully three-dimensional figure of a waterfowl and can be compressed into a nearly flat package. A coiled spring is provided within the interior of the hollow decoy body, the decoy body being covered by a fabric of resembling a birds body.

It is an object of the present invention to provide a device which allows for the easy carrying of waterfowl decoys.

It is another object of the present invention to provide a waterfowl decoy carrying storage and device which prevents entanglement of the cables of the waterfowl decoys.

It is another object of the present invention to provide a waterfowl decoy device which enables easy storage of the decoys.

It is another object of the present invention to provide a waterfowl decoy carrying and storage device which is relatively inexpensive and an easy to manufacture.

These and other objects and advantages of the present invention will become apparent from a reading of the attached specification and appended claims.

BRIEF SUMMARY OF THE INVENTION

The present invention is a apparatus for carrying waterfowl decoys, specifically duck decoys. The apparatus includes a hollow tubular member with an inner diameter. A line extends through the interior of the hollow tubular member. A first clip member is affixed to one end of the line, and a second clip member is affixed to another end of the line. The second clip member has a dimension greater than the inner diameter of the hollow tubular member. The first clip member has a dimension less than an inside diameter of the hollow tubular member. Preferably, the present invention, the hollow tubular member is flexible. In one embodiment of the present invention, each of the first clip member and the second clip member is a carabiner.

In an embodiment of the present invention, the first clip member is adapted to receive the waterfowl decoys or cable connected to the waterfowl decoys. The first clip member is preferably movable through the interior of the hollow tubular member. The second clip member is preferably adapted to receive the waterfowl decoys or the cable connected to the waterfowl decoys. In the present invention, the second clip member is connectable to the waterfowl decoys or to the cable connected to the waterfowl decoys so as a collectively form a loop with the hollow tubular member and the line. Additionally, the second clip member has a ring attached thereto. The first clip member being connectable to the ring.

In the present invention, preferably, the line has a greater length than a length of the hollow tubular member. The hollow tubular member preferably has a length less than the length of the cable of the waterfowl decoys.

The present invention is also an apparatus having a plurality of waterfowl decoys each having a cable extending therefrom. The cable has a loop on an end thereof opposite the decoy. A first attachment member releasably receives the loops of the plurality of waterfowl decoys. A line is affixed to the first attachment member. A hollow tubular member is provided which has an interior. The line extends through the interior of the hollow tubular member. A second attachment member is affixed to the line opposite the first attachment member. The second attachment member is suitable for receiving the loops of the waterfowl decoys from the first attachment member.

In the present invention, the first attachment member has a width less than inside diameter of the hollow tubular member, and a second attachment member has a with greater than the inside diameter of the hollow tubular member.

In the present invention, the first attachment member is preferably movable through the interior of the hollow tubular member so as to draw the cables of the plurality of waterfowl decoys into the interior of the hollow tubular member. The second attachment member preferably has a third attachment of the attached thereto. The third attachment member is suitable for attaching to the first attachment member.

The third attachment member is preferably a ring. Each of the first attachment member and second attachment members may be a clip, preferably a carabiner.

In the present invention, the hollow tubular member is preferably flexible.

Preferably, the plurality of waterfowl decoys are duck decoys.

This foregoing Section is intended to describe, in generality, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

BRIEF DESCRIPTION OF THE SEVERAL VIEWS OF THE DRAWINGS

FIG. 2 is a side view showing the waterfowl carrying storage device of the present invention.

DETAILED DESCRIPTION OF THE INVENTION

Figure 1:
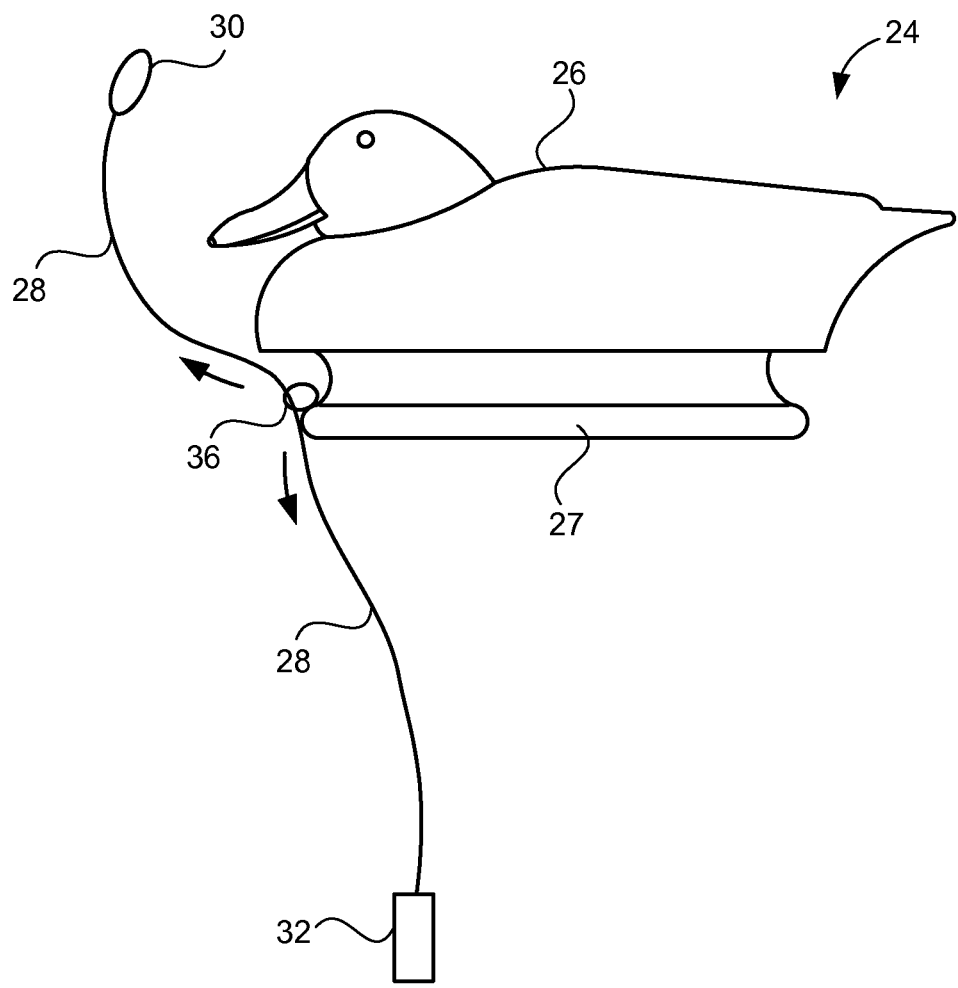
FIG. 1 is shows a side view of a duck decoy as commonly used in the prior art.

Referring to FIG. 2, there is shown the duck decoy carry apparatus and system 10 of the present invention. The carrying apparatus 10 of the present invention can be used for duck decoys or other waterfowl decoys. The apparatus 10 includes a hollow tubular member 12, with a line 14 running therethrough. Preferably, the line 14 is a nylon or plastic line, but also may be any number of materials or types of lines, such as rope, wire rope, etc.

A first clip member 16 is affixed to one end of the line 14. Preferably, the first clip member or attachment member is a carabiner or other such clip. However, other attachment devices may be used within the concept of the present invention. Opposite the first clip member 16 is the second clip member 18. The second clip member 18 shown on an opposite side of the hollow tubular member 12 from the first clip member 16. The second clip member 18 is shown as having a ring 34, or third attachment member, attached thereto.

Importantly, the first clip member 16 is dimensioned such that it can be received within the interior of the hollow tubular member 12. The hollow tubular member 12 is shown as having inner diameter D. The dimension of the first clip member 16 allows it to pass within the interior of the hollow tubular member 12 and be pulled therethrough, as will be described herein below. The second clip member 18 is importantly dimensioned such that it is larger than the inner diameter D.

In FIG. 2, it can be seen that the first clip member 16 and second member 18 are in the form of carabiners. The first clip member 16 is shown as having a gate 20 which is pivotable so as to expose interior of the first clip member 16. The second position of the gate 20 is shown in broken lines. Similarly, the second clip member 18 is shown as having a gate 22. The gate 22 is pivotable so as to expose interior of the second clip member 18, the second position of the gate 22 being shown in broken lines. The line 14 is shown in broken lines extending through the interior of the hollow tubular member 12.

Preferably, the hollow tubular member 12 is a plastic, rubber, PVC or nylon tube. Preferably also, the hollow tubular member 12 is flexible and lightweight.

FIG. 2 also shows a plurality of duck decoys 24 of the type described herein above and shown in FIG. 1. The carrying apparatus 10 of the present invention can be utilized to carry twelve or more duck decoys 24. However, for clarity, the figures herein show three duck decoys 24.

Figure 3:
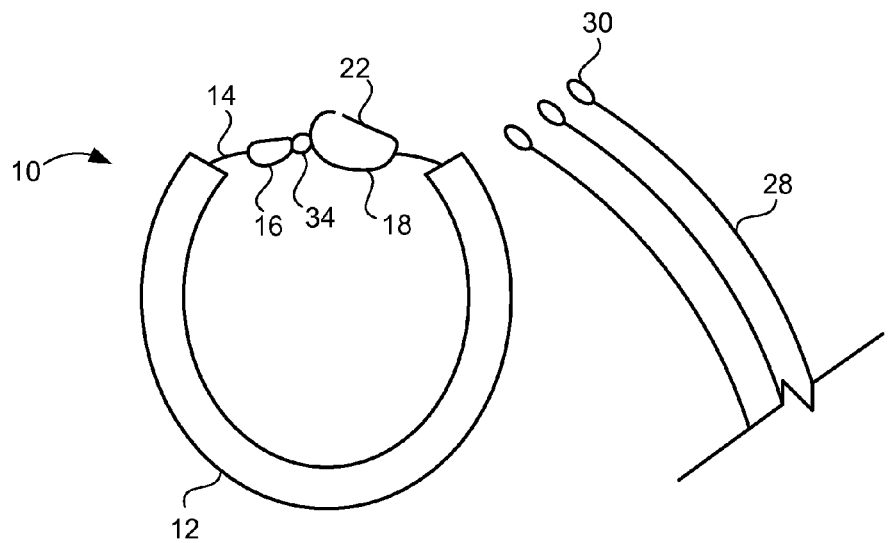
FIG. 3 shows a side view of the apparatus of the present invention wherein the waterfowl decoys are initially being attached to the apparatus.

FIGS. 3-6 show how the plurality of duck decoys 24 are collected and carried using the apparatus 10 of the present invention. Referring to FIG. 3, the initial attachment of the duck decoys 24 is shown. FIG. 3 shows the hollow tubular member 12 in a coiled configuration. In this configuration, the first clip member 16 is attached to the ring 34 of the second clip member 18, thus forming a circle. The various loops 30 of the plurality of duck decoys 24 are at this point clipped onto the second clip member 18. Use of the larger second clip member 18 allows for easier connection of the loops 30 of the plurality of duck decoys 24. Once the loops 30 are positioned on the second clip member 18, the loops 30 are then transferred to the first clip member 16. The transfer involves unclipping the first clip member 16 from the ring 34 and clipping the first clip member 16 around the loops 30 which have been placed on the second clip member 18. Once the loops 30 have been collected on the second clip member 18, they can be pushed together so as to allow easy transfer to the first clip member 16.

Figure 4:
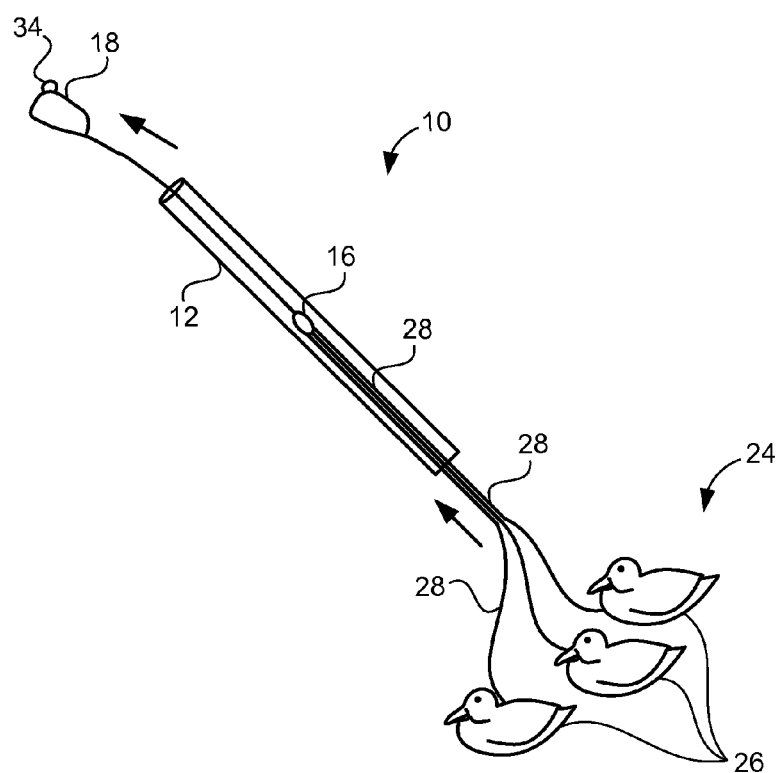
FIG. 4 shows a side view, partially transparent, wherein the waterfowl decoys are being pulled through the hollow tubular member of the apparatus of the present invention.

Referring to FIG. 4, there is shown the next step in the use of the apparatus 10 of the present invention. In FIG. 4, it can be seen how the first clip member 16 has been unclipped from the second clip member 18 or ring 34. The second clip member 18 then serves as a handle to be used to pull the first clip member 16 into the interior of the hollow tubular member 12. FIG. 4 shows how the various cables 28 of the plurality of duck decoys 24 are then pulled into the interior of the hollow tubular member 12. This serves prevent entanglement of the various cables when collecting the duck decoys 24.

Figure 5:
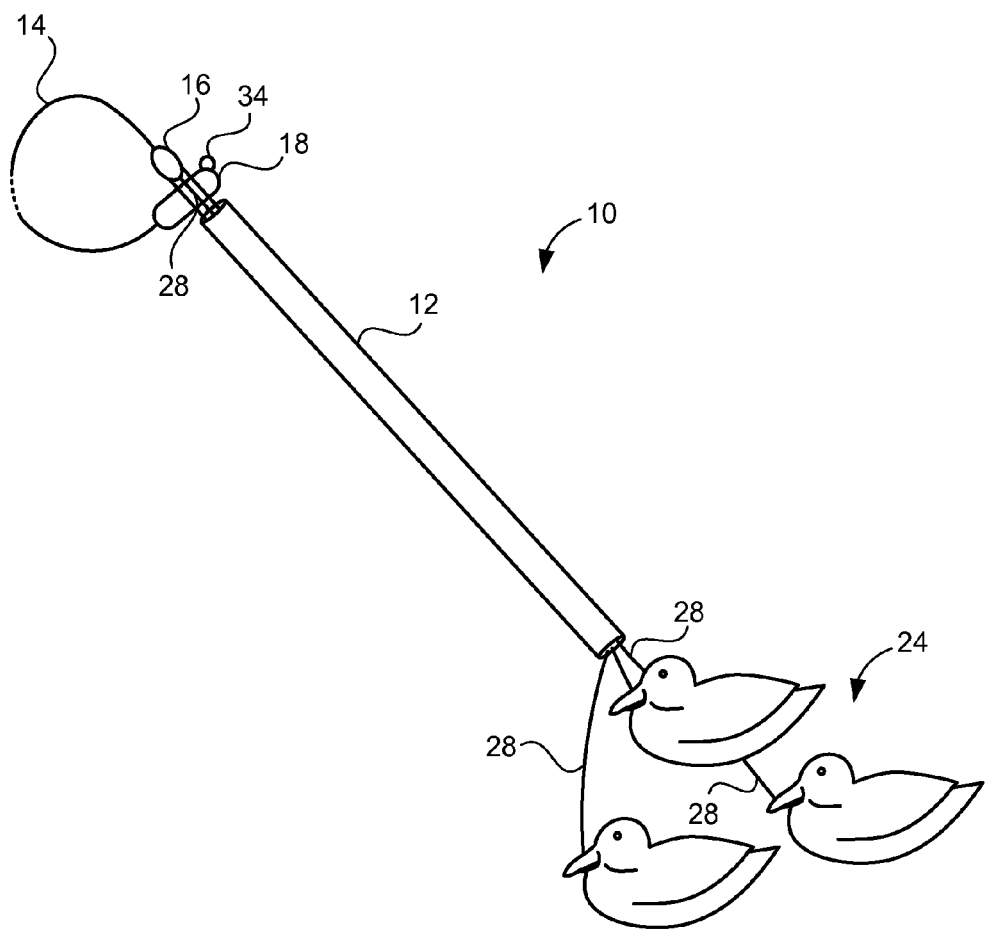
FIG. 5 shows a side view of the present invention wherein the device is in a condition for carrying the waterfowl decoys.

Referring to FIG. 5, it can be seen how the first clip member 16 has been pulled fully through the interior of the hollow tubular member 12, resulting in the floats 26 of the plurality of duck decoys 24 residing in a position adjacent the hollow tubular member 12. FIG. 5 also shows how, once the first clip member 16 has been pulled through the interior of the hollow tubular member 12, the second clip member 18 can be attached around the exposed cables 28 which have been pulled through the hollow tubular member 12. Alternatively, the second clip member 18 could be clipped to the first clip member 16. At this point, the large size of a second clip member 18 prevents the cables 28 of the plurality of duck decoys 24 from moving back through the hollow tubular member 12. In this state, the apparatus 10 can be used to transport the plurality of duck decoys 24. The hunter can simply lift the hollow tubular member 12 or the second clip member 18.

Figure 6:
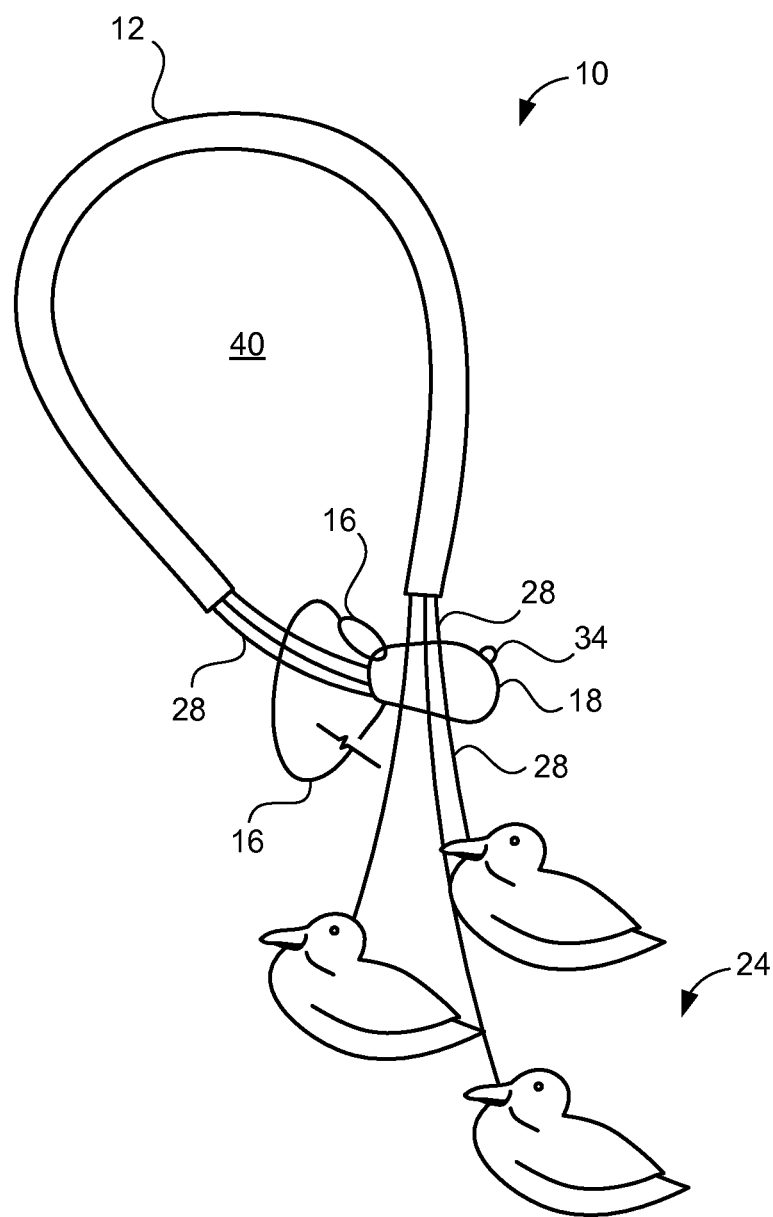
FIG. 6 a side view showing a the device of the present invention wherein the hollow tubular member is in the configuration of a loop suitable for carrying.

Referring to FIG. 6, it can be seen how the apparatus 10 is in a better condition for carrying on the shoulder of the user or hunter. In FIG. 6, the hollow tubular member has been bent into a coiled position such that the second clip member 18 can be attached around the exposed cables 28 adjacent the floats 26. As such, the apparatus 10 now presents an interior 40 which can be positioned around the shoulder of the hunter. This allows for easy carrying and storage of the plurality of duck decoys 24.

Figure 7:
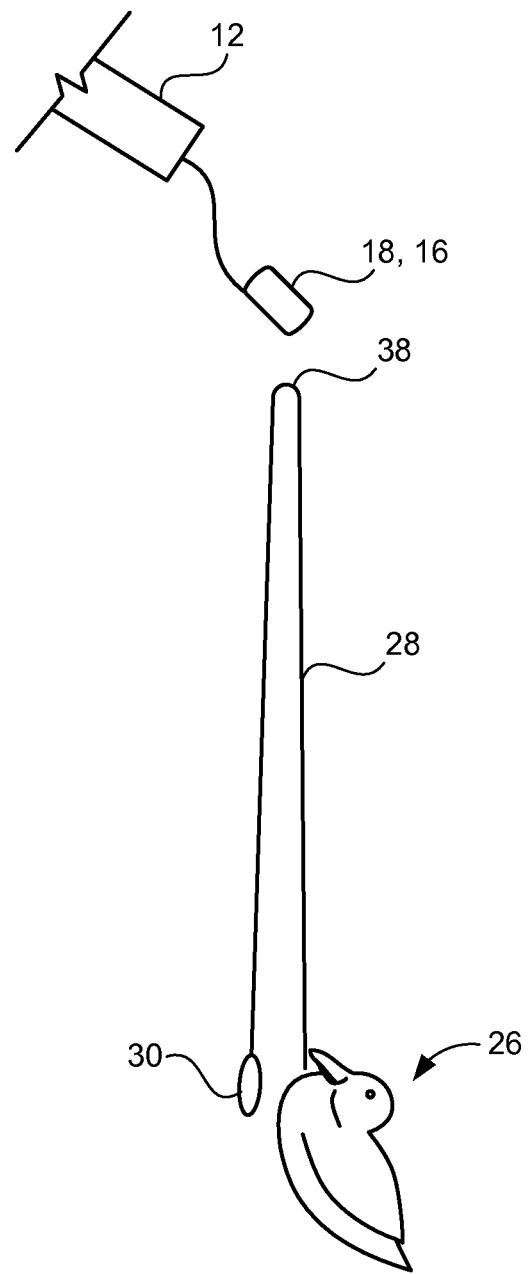
FIG. 7 shows a schematic view wherein the decoy cable is folded for insertion into the apparatus of the present invention.

Referring to FIG. 7, there is shown a duck decoy were in the cable 28 is longer than the standard cable. In this case, the cable 28 can be folded over so as to create a crease or fold 38 in the cable 28. The first clip 16 or second clip 18 can then be connected to the crease 38 of the cable 28 so as to draw the cable 28 within the interior of the hollow tubular member 12.

Waterfowl decoy are provided with cables having various lengths, including thirty inch cables and fifty-four inch cables. As such, the present invention can be provided in different embodiments wherein the length of the hollow tubular member 12 corresponds with a specific length for waterfowl decoys.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for carrying waterfowl decoys, the apparatus comprising:
   a hollow tubular member having an inner diameter;
   a line extending through an interior of said hollow tubular member;
   a first clip member affixed to one end of said line; and
   a second clip member affixed to another end of said line, said second clip member having a dimension greater than said inner diameter of said hollow tubular member.

2. The apparatus of claim 1, said first clip member having a dimension less than an inside diameter of said hollow tubular member.

3. The apparatus of claim 1, said hollow tubular member being flexible.

4. The apparatus of claim 1, each of said first clip member and said second clip member being a carabiner.

5. The apparatus of claim 1, said first clip member adapted to receive the waterfowl decoys or a cable connected to the waterfowl decoys.

6. The apparatus of claim 5, said first clip member being movable through said interior of said hollow tubular member.

7. The apparatus of claim 6, said second clip member adapted to receive the waterfowl decoys or the cable connected to the waterfowl decoys.

8. The apparatus of claim 7, said second clip member being connectable to the waterfowl decoys or to the cable connected to the waterfowl decoys so as to collectively form a loop with said hollow tubular member and said line.

9. The apparatus of claim 8, said second clip member having a ring attached thereto, said first clip member being connectable to said ring.

10. The apparatus of claim 1, said line having a length greater than a length of said hollow tubular member.

11. The apparatus of claim 1, said hollow tubular member having a length less than a the length of the cable of the waterfowl decoys.

12. An apparatus comprising:
  a plurality of waterfowl decoys each having a cable extending therefrom, said cable having a loop on an end thereof opposite the decoy;
  a first attachment member releasably receiving said loops of said plurality of waterfowl decoys;
  a line affixed to said first attachment member;
  a hollow tubular member having an interior, said line extending through said interior of said hollow tubular member; and
  a second attachment member affixed to said line opposite said first attachment member, said second attachment member suitable for receiving said loops of said plurality of waterfowl decoys from said first attachment member.

13. The apparatus of claim 12, said first attachment member having a width less than an inside diameter of said hollow tubular member, said second attachment member having a width greater than said inside diameter of said hollow tubular member.

14. The apparatus of claim 13, said first attachment member movable through said interior of said hollow tubular member so as to draw said cables of said plurality of waterfowl decoys into said interior of said hollow tubular member.

15. The apparatus of claim 12, said second attachment member having a third attachment member affixed thereto, said third attachment member suitable for attaching to said first attachment member.

16. The apparatus of claim 15, said third attachment member being a ring.

17. The apparatus of claim 12, each of said first attachment member and said second attachment member being a clip.

18. The apparatus of claim 17, said clip being a carabiner.

19. The apparatus of claim 12, said hollow tubular member being flexible.

20. The apparatus of claim 12, said plurality of waterfowl decoys being duck decoys.

* * * * *